United States Patent Office 3,232,912
Patented Feb. 1, 1966

3,232,912
PROMOTING FREE RADICAL POLYMERIZATION
OF UNSATURATED MATERIALS
John C. Munday, Cranford, and Dilworth T. Rogers,
Summit, N.J., assignors to Esso Research and Engineering Company, a corporation of Delaware
No Drawing. Filed Sept. 11, 1961, Ser. No. 137,021
7 Claims. (Cl. 260—80)

This invention relates to the polymerization of unsaturated materials to form useful polymers and copolymers. The invention is still more particularly directed to the use of a promoter in conjunction with free radical catalysts for the polymerization of unsaturated esters and/or unsaturated acids.

It has been known in the art that valuable products can be prepared by the polymerization of certain unsaturated acids and of certain unsaturated esters. Many of these polymers that are mineral-oil-soluble have the ability of improving the viscosity-temperature characteristics and/or the low temperature pour point properties of lubricating oils when added thereto. Some of the mineral-oil-soluble polymers may be used as detergents in lubricating oil compositions or as sludge dispersants in heating oils. Some polymers are water-dispersible and can be used as adhesives. Still other polymers are both oil-insoluble and water-insoluble plastics.

The materials that are polymerized in accordance with the present invention include acrylates, acrylic acid, methacrylates, fumarates, maleates, vinyl esters and copolymers thereof, as well as mixtures of the polymers mentioned. The polymerization of the unsaturated esters is conveniently conducted with the aid of what are known as free radical catalysts. Such catalysts include benzoyl peroxide, lauoyl peroxide, tert.-butyl hydroperoxide, tert.-butyl perbenzoate, and azodiisobutyronitrile.

In many instances there has been a need for improving either the rate of polymerization or the yield of polymer obtained when polymerizing unsaturated acids and esters. This has resulted in a continuing search for more satisfactory catalysts or for promoters for the commonly used catalysts.

In accordance with the present invention, it has been found that the polymerization of unsaturated esters or acids in the presence of a free radical catalyst of the type mentioned above can be promoted by adding to the composition being polymerized, an N-vinyl pyrrolidone, e.g., N-vinyl pyrrolidone or a polymer or copolymer thereof, in an amount not exceeding 1 weight percent of the monomer.

The N-vinyl pyrrolidone has the following general formula:

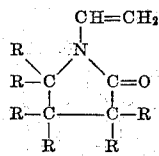

wherein each R represents either hydrogen or an alkyl group of from 1 to 5 carbon atoms. While N-vinyl pyrrolidone itself (i.e., where each of the R's is hydrogen) or a polymer or copolymer thereof is preferred in practicing this invention, other representive N-vinyl pyrrolidones that may be employed include 3-methyl-1-vinyl pyrrolidone,
3-ethyl-1-vinyl pyrrolidone, 5-methyl-1-vinyl
    pyrrolidone, 4-ethyl-1-vinyl pyrrolidone
3,5-dimethyl-1-vinyl pyrrolidone,
3,4-dimethyl-5-propyl-1-vinyl pyrrolidone,
3-amyl-3,5-dimethyl-1-vinyl pyrrolidone,
and the like.

The invention is particularly applicable to solution polymerization wherein the monomer is completely dissolved in a solvent and the polymerizing catalyst is added to the homogeneous system. The solvents include naphthas, lubricating oils, white oils, benzene, toluene, esters, ethers, chlorinated solvents, and the like.

If the polymer being prepared is to be used in a mineral lubricating oil or fuel oil and the polymerization takes place in a volatile solvent, it is convenient to add the concentrated solution of the polymer to a mineral oil and then distill off the solvent, leaving the polymer as a concentrate in the mineral oil. This concentrate is then available for addition to a hydrocarbon fuel or to a lubricating oil in the desired proportion. In general, such polymers are employed in concentrations of from about 1 to 15 weight percent for imparting sludge dispersancy and/or viscosity improving properties to lubricating oils and in concentrations in the range of about 0.002 to 0.1 weight percent when used as sediment or sludge dispersants in fuel oils.

The invention is applicable to the polymerization of any of the classes of unsaturated acids and unsaturated esters that have been found useful as drying oils, plastics, and water-soluble thickeners, and as lubricating oil and heating oil additives. Unsaturated esters than can be used are of two general groups; i.e., esters of unsaturated alcohols and esters of unsaturated acids. The former include the vinyl, allyl, crotonyl and oleyl esters of such acids as hydrochloric, acetic, propionic, butyric, 2-ethyl caproic and stearic acids, for example. The esters of unsaturated acids include the alcohol esters of acrylic acid, methacrylic acid, and alpha, beta-unsaturated polycarboxylic acids such as fumaric, maleic, itaconic, etc. In general, the alcohols used in preparing the latter esters are selected from $C_1$–$C_{20}$ aliphatic alcohols such as methyl, butyl, octyl, isooctyl, 2-ethylhexyl, nonyl, 2,2,4,4-tetramethylamyl, decyl, eicosyl, dodecyl, tetradecyl, cetyl, and stearyl. Specific esters and acids which may be polymerized in accordance with this invention include vinyl acetate, vinyl chloride, vinyl butyrate, acrylic acid, methacrylic acid, methyl methacrylate, nonyl acrylate, and dodecyl fumarate.

Commercially marketed mixtures of alcohols consisting essentially of saturated aliphatic alcohols having the requisite chain length may also be used in preparing unsaturated esters that are to be polymerized by the method of this invention. One mixture of commercial alcohol is prepared by the hydrogenation of coconut oil and is sold under the tradename "Lorol" and comprises saturated aliphatic alcohols containing from 8 to 18 carbon atoms per molecule. This mixture consists chiefly of lauryl alcohol having 12 carbon atoms per molecule. A representative composition contains about 4 weight percent $C_{10}$; 56 wt. percent $C_{12}$; 22 wt. percent $C_{14}$; 14 wt. percent $C_{16}$; and 4 wt. percent $C_{18}$ alcohols. Tallow alcohol is a similar mixed product obtained from tallow fat by hydrogenation, and consists primarily of cetyl and stearyl alcohols.

Oxo alcohols may also be employed. These are well known in the art and can be prepared by reaction of olefins with carbon monoxide and hydrogen in the presence of a suitable catalyst such as cobalt or other Group VIII metal. The products are chiefly alcohols and aldehydes containing one more carbon atom than the starting olefin. The aldehydes in the product are then hydrogenated in a separate catalytic stage to convert them to the corresponding alcohols. Thus, $C_8$ Oxo alcohols can be prepared from $C_7$ olefins in this manner. These are predominantly branched chain alcohols consisting principally of isomers of the formula:

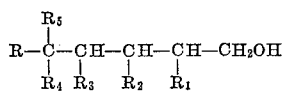

where R stands for methyl or ethyl and $R_1$, $R_2$, $R_3$, $R_4$ and $R_5$ stand for hydrogen or methyl groups, and wherein $R_1$ plus $R_2$ plus $R_3$ plus $R_4$ plus $R_5$ contain up to 2 carbon atoms. A typical $C_8$ Oxo alcohol consists of about 29% of 3,5-dimethylhexanol, 25% of 4, 5-dimethyl hexanol, 17% of 3, 4-dimethylhexanol, 16% of 4-methylhepantol plus 5-methylheptanol, 2% of 4-ethylhexanol, and 9% of other alcohols.

The amount of N-vinyl pyrrolidone used as a polymerization promoter in accordance with the present invention may range from about 0.05 to about 1 wt. percent of the monomer or monomer mixture being polymerized. It is used in conjunction with from about 0.1 to about 2 wt. percent of a free radical catalyst of the types mentioned above. Polymerization temperatures may range from about 50 to about 150° C. and reaction times will range from about ½ to 50 hours.

The N-vinyl pyrrolidone may be used in the form of its monomer or in the form of polymers or copolymers of up to 20,000 molecular weight or higher.

As is well known, N-vinylpyrrolidone can be prepared by vinylating pyrrolidone with acetylene at elevated pressures in the presence of a strong base such as potassium hydroxide. Pyrrolidone can be obtained by reaction of butyrolactone with ammonia or by thermal decomposition of gamma-amino butyric acid.

The following examples serve to illustrate the invention:

EXAMPLE 1

A commercially available methyl methacrylate, diluted with an equal weight of normal heptane, was polymerized at 80° C. under a blanket of nitrogen for 2.5 hours using 1 wt. percent of tert.-butyl perbenzoate as catalyst. A second quantity of methyl methacrylate was polymerized in the same manner with the same amount of catalyst but there was added to the batch about 1 weight percent of a copolymer of 8 weight percent N-vinyl pyrrolidone and 92 weight percent of mixed methacrylates of $C_4$ to $C_{18}$ aliphatic alcohols averaging 9.5 carbon atoms, the copolymer having a Staudinger molecular weight of about 18,000. The mixed methacrylates contained approximately equal proportions of $C_4$ methacrylate $C_8$–$C_{10}$ methacrylates, Lorol methacrylate, and tallow methacrylate. The yields obtained are shown in Table I:

Table I

| | Polymer yield, weight percent |
|---|---|
| Without promoter | 19.8 |
| With promoter | 28.8 |

It will be seen that addition of the promoter gave an increase in yield of almost 50% as compared with the polymerization without the promoter. The polymer yields were determined by adding methanol to the solution to precipitate the polymer, decanting liquid from the precipitate, and weighing the precipitate after it had been dried under vacuum.

EXAMPLE 2

A portion of freshly distilled acrylic acid was diluted to 20 vol. percent concentration with normal heptane and polymerized at 80° C. for 200 minutes under a blanket of nitrogen, using 1 wt. percent of tert.-butyl perbenzoate as catalyst. Two separate batches were similarly polymerized with the exception that one of them contained an added 0.1% of N-vinyl pyrrolidone monomer and the other contained 0.1% of diethylaminoethyl methacrylate monomer. The results are compared in Table II:

Table II

| | Polymer yield, weight percent |
|---|---|
| No promoter added | 26.6 |
| N-vinyl pyrrolidone added | 48.6 |
| Diethylaminoethyl methacrylate added | 9.5 |

It will be seen that while N-vinyl pyrrolidone promoted the polymerization reaction, diethylaminoethyl methacrylate did not, showing that the polymerization is not promoted merely by the presence of other nitrogen-containing compounds.

EXAMPLE 3

Duplicating the condition of Example 2, acrylic acid was polymerized, using as the promoter 1% of the methacrylate-N-vinyl pyrrolidone described in Example 1. Polymerization was quite rapid, becoming almost explosive at 32 minutes. When this promoter was replaced in a duplicate experiment with 1 weight percent of a simple copolymer of $C_8$–$C_{10}$ methacrylates of about 18,000 Staudinger molecular weight, no promotional activity was observed.

It is to be recognized that the present invention is fully distinguishable from the prior art use of N-vinyl pyrrolidone as a constituent of copolymers containing 5 percent or more of N-vinyl pyrrolidone along with other polymerizable materials such as alkyl esters of acrylic acid and/or methacrylic acid. In such copolymers the N-vinyl pyrrolidone functions to modify the properties of the polymer; whereas, in the present invention the amount of N-vinyl pyrrolidone is so minor that it does not function in that capacity.

The foregoing examples have been furnished for the purpose of illustrating the invention and the manner in which it may be practiced. There is no intention to limit the invention to the specific examples. The scope of the invention is to be defined by the claims appended hereto.

What is claimed is:

1. In the polymerization of an unsaturated monomer selected from the group consisting of acrylic acid, $C_1$ to $C_{20}$ aliphatic alcohol esters of acrylic acid, and $C_1$ to $C_{20}$ aliphatic alcohol esters of methacrylic acid, in the presence of a catalyst consisting of a peroxide, the improvement which comprises promoting the polymerization by adding to the mixture of monomer and catalyst from about 0.05 to about 1 weight percent of a promoter selected from the group consisting of monomers, homopolymers and copolymers of N-vinyl pyrrolidones which in their monomer form have the formula:

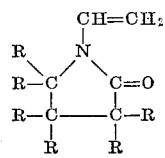

wherein each R is selected from the group consisting of hydrogen and $C_1$ to $C_5$ alkyl groups, the resulting mixture that is being polymerized being devoid of unsaturated compounds other than the aforesaid acrylic acid, acrylic acid esters, methacrylic acid esters and N-vinyl pyrrolidones.

2. Polymerization process as defined by claim 1 wherein said unsaturated compound comprises acrylic acid.

3. Polymerization process as defined by claim 1 wherein said unsaturated compound comprises an alkyl methacrylate.

4. Polymerization process as defined by claim 1 wherein said catalyst comprises tert.butyl perbenzoate.

5. Polymerization process as defined by claim 1 wherein said N-vinyl pyrrolidone is in polymerized form.

6. Polymerization process as defined by claim 1 wherein said N-vinyl pyrrolidone is in the form of a copolymer with an alkyl methacrylate of a $C_4$ to $C_{18}$ aliphatic alcohol.

7. Process as defined by claim 1 wherein said polymerization is conducted with said unsaturated monomer dissolved in a solvent.

References Cited by the Examiner

UNITED STATES PATENTS

| | | | |
|---|---|---|---|
| 2,922,768 | 1/1960 | Mino et al. | 260—80 |
| 3,030,319 | 4/1962 | Kalzerman et al. | 260—89.1 |
| 3,137,679 | 6/1964 | Aguis et al. | 260—78.5 |

JOSEPH L. SCHOFER, *Primary Examiner.*

J. R. LIBERMAN, *Examiner.*